Nov. 17, 1964 E. J. MYSIAK 3,156,920
MAGAZINE CONSTRUCTION
Filed March 23, 1962
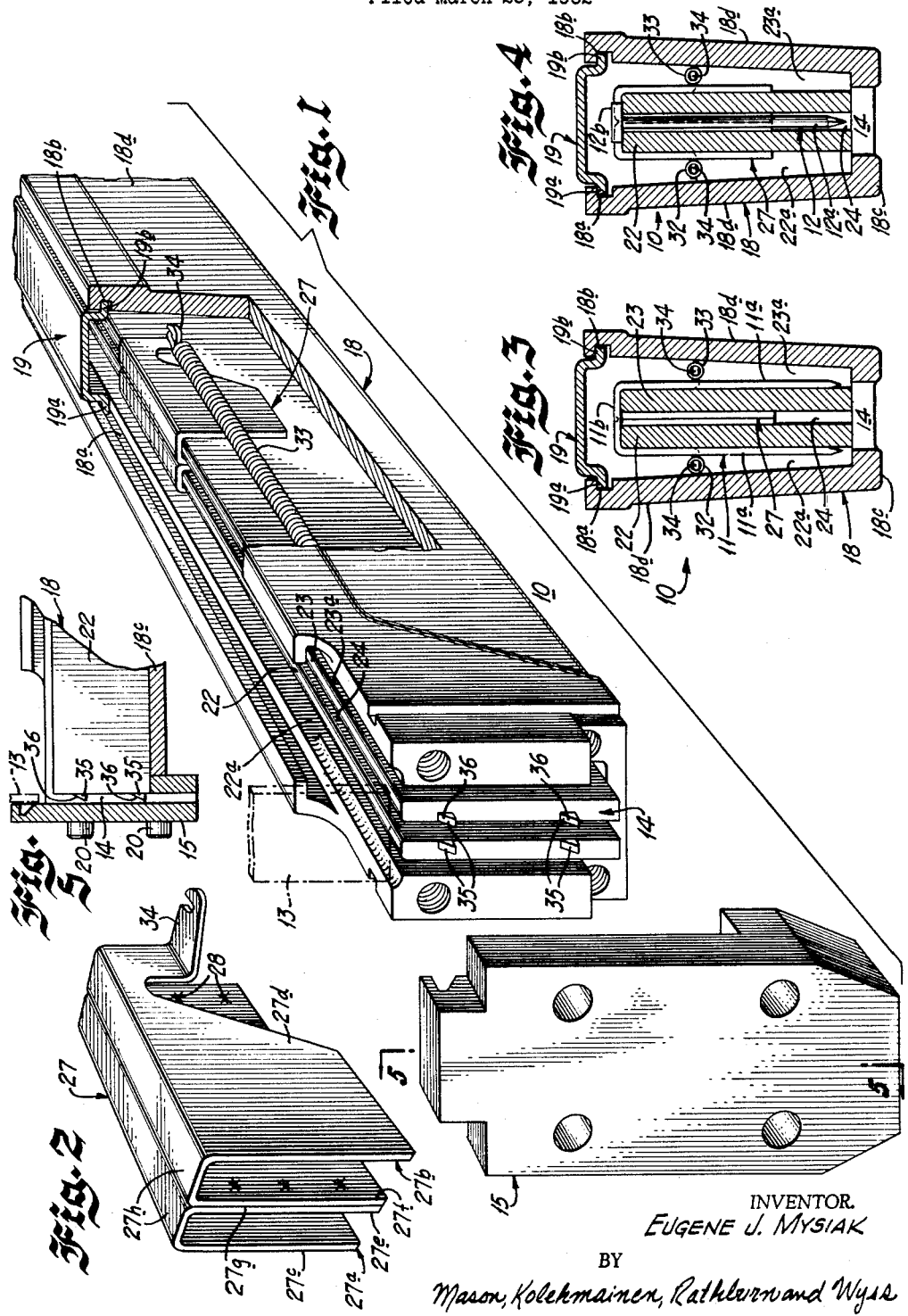
INVENTOR.
EUGENE J. MYSIAK
BY
Mason, Kolehmainen, Rathburn and Wyss
ATTORNEYS

United States Patent Office 3,156,920
Patented Nov. 17, 1964

3,156,920
MAGAZINE CONSTRUCTION
Eugene J. Mysiak, Cicero, Ill., assignor to Fastener Corporation, Franklin Park, Ill., a corporation of Illinois
Filed Mar. 23, 1962, Ser. No. 181,976
7 Claims. (Cl. 1—3.1)

This invention relates to a magazine construction for a fastener driving device, and, more particularly, to a magazine provided with means for interchangeably supporting and advancing a plurality of staples or a plurality of nails toward a drive track of the fastener driving device.

Commercially available fastener driving devices of manual or power driven types, such as pneumatically driven fastener devices, afford easily manipulated means for driving fasteners into varying types of workpieces at high speed. Although the existing apparatus, which generally uses fasteners in the form of staples which are driven into workpieces without clinching, is capable of providing satisfactory means for securing materials together, there remain a number of fastening operations in which single-headed fasteners, such as nails, are preferred. Attempts have been made to provide fastener driving apparatus using strips or "sticks" of detachably joined and headed nail-type fasteners, but these prior arrangements suffer from various deficiencies. The magazine construction disclosed in U.S. Patent 2,909,780, granted to Oscar A. Wandel on October 27, 1959, wherein a pair of staplelike fastening devices having a pair of abutting legs are driven simultaneously into the workpiece, offers a partial solution to this problem. However, it may be desirable to drive a fastener of the type wherein there is but a single leg or shank as in a nail. One such nail-type fastener is described in U.S. Patent 2,294,463, granted September 1, 1946, to Krantz, and assigned to the same assignee as the present invention.

Accordingly, one object of the present invention is to provide a new and improved magazine construction having means for interchangeably feeding a plurality of staple-type fasteners or a plurality of nail-type fasteners to a fastener driving tool.

Another object of the present invention is to provide a new and improved magazine which is adapted to support and advance a plurality of staple-type fasteners provided with a pair of spaced leg portions interconnected by a crown portion or a plurality of nail-type fasteners having a single shank and head.

A further object of the present invention is to provide a new and improved magazine construction for a fastener driving tool.

Further objects and advantages of the present invention will become apparent as the following description proceeds and the features of novelty which characterize the invention will be pointed out with particularity in the claims annexed to and forming a part of this specification.

In accordance with these and many other objects of the present invention, there is provided a new and improved magazine for a fastening tool which will interchangeably support and advance a plurality of wire staples or staple-type fasteners and nails or nail-type fasteners in back-to-back relationship to a fastener drive track in the fastener driving tool. The magazine includes a support having a pair of spaced grooves for receiving the spaced apart legs of a conventional inverted U-shaped staple, and, additionally, is provided with a nail groove intermediate the spaced grooves for receiving the shank of a nail. The staples and nails are fed through the magazine in the form of a strip or "stick" of fasteners detachably joined to the adjacent fasteners in the strip. A pusher is provided in the magazine which rides on the support and is adapted to engage the staples and the nails. The pusher means is spring-biased to urge the fasteners toward the front of the magazine and into the drive track of the fastening device.

For a better understanding of the present invention reference may be had to the accompanying drawing wherein:

FIG. 1 is an exploded perspective view of a magazine assembly according to the present invention with certain portions cut away more clearly to illustrate the invention and with the staple driver blade shown in phantom;

FIG. 2 is a perspective view of the fastener pusher of the magazine of FIG. 1, drawn to a larger scale than in FIG. 1;

FIG. 3 is a cross-sectional view of the magazine of FIG. 1, illustrated with a stick of staple-type fasteners;

FIG. 4 is a cross-sectional view of the magazine of FIG. 1, illustrated with a stick of nail-type fasteners; and FIG. 5 is a fragmentary sectional view to a reduced scale taken substantially on line 5—5 of FIG. 1, assuming that FIG. 1 shows the assembled complete structure.

As indicated above, the ease and speed of driving fasteners, such as staples, nails, or tacks, by the use of hand or power operated fastener driving tools has led to the use of this type of equipment over a wide range of fabricating operations. However, in certain industries, there has been a marked reluctance to adopt power operated stapling equipment because of the belief that headed fasteners are required to provide adequate securing of certain elements. It has, therefore, been proposed to provide nail-type fasteners comprising a unitary elongated shank and a transverse head portion secured to the shank with the individual fasteners being detachably joined to a strip or stick for use in a magazine or similar fastener feeding mechanism. Additionally, it is desirable that the same fastener driving apparatus be selectably interchangeable to drive conventional staple-type fasteners wherein the fastener is provided with a pair of spaced leg portions interconnected by a crown portion.

According to the invention, this result is accomplished by providing a new and improved fastener feeding magazine 10 for use with a fastener driver such as a pneumatically operated fastener driving apparatus. As best illustrated in FIG. 3, the magazine is adapted to receive and advance a stick of staple-type fasteners 11 each having a pair of spaced leg portions 11a interconnected by a transverse crown portion 11b. The individual fasteners 11 are detachably adhesively joined in back-to-back relationship as is well known. Additionally, the fastener magazine 10 will support and advance a stick of nail-type fasteners 12, FIG. 4, each provided with a unitary elongated shank portion 12a and a transverse head portion 12b. The individual fasteners 12 are detachably joined to the adjacent fasteners in the strip in back-to-back relationship.

Although there are many types of well-known driving apparatus suitable for use in carrying out the present invention, the fastener driving apparatus may be of the pneumatic type disclosed in United States Patent No. 2,979,725, granted April 18, 1961, to O. A. Wandel et al., and assigned to the same assignee as the present application, or of the type described in the copending application of O. A. Wandel, Serial No. 37,508, filed June 20, 1960, and assigned to the same assignee as the present invention. In prior fastening devices, such as pneumatically operated fastener drivers, there is generally provided a cylinder secured to a casting or housing which is closed at its upper end and a piston is generally slidably mounted within the cylinder receiving a supporting member to which the upper end of a driving blade, illustrated in phantom as 13 in FIGS. 1 and 5, is secured. When compressed air is admitted to the interior of the cylinder under the control of a trigger actuated control valve, the piston moves downwardly to advance the driving blade 13 through a drive track 14 formed in a nosepiece 15 of the fastener magazine 10. During this downward movement, the end of the driving blade 13 engages the crown portion of the staple-type fasteners 11 or the head portion 12b of the nail-type fasteners 12 in the drive track 14, and drives it out of the bottom of the drive track 14 into the workpiece. When the trigger-controlled valve is released, means are provided generally interposed between the blade and the nosepiece to resiliently return the piston to retract the driver blade 13 from the drive track 14 so that the magazine 10 supplies another fastener 11 or 12 to the drive track 14.

Referring now to the magazine construction 10 which interchangeably feeds staple-type fasteners 11 or nail-type fasteners 12 into the drive track 14 for setting by the driving blade 13, this construction includes a base plate 18 secured at one end to the noisepiece 15 and at its other end to a depending cover portion 19 of the fastener driving tool in somewhat the form of an inverted channel section provided with outwardly turned flanges 19a and 19b engaged in respective support grooves 18a and 18b of the base plate 18. The base plate 18 includes a bottom or bight portion 18c and a pair of spaced, longitudinally extending leg portions 18d to form a partial enclosure for the fasteners 11 and 12. A plurality of bolts 20, FIG. 5, secure the nosepiece 15 and the base plate 18 together.

To slidably support the strip of fasteners 11 or 12 in back-to-back relationship, the fastener magazine 10 is additionally provided with a pair of spaced longitudinally extending fastener support portions 22 and 23 intermediate the spaced leg portions 18d and secured to the upper wall of the bottom portion 18c of the base plate 18. The fastener support portions 22 and 23 form grooves 22a and 23a with the leg portions 18d of the support 18 to receive the leg portions 11a of staple-type fasteners 11 and are dimensioned to loosely support and guide a strip of staple-type fasteners 11 in inverted position from their crowns 11b with their spaced leg portions 11a positioned closely adjacent the outer side of the fastener support portions 22 and 23, as best illustrated in FIG. 3. Moreover, the spaced upstanding support portions 22 and 23 define a fastener guide groove 24 therebetween for loosely receiving and guiding the shank portion 12a of nail-type fasteners 12, as best illustrated in FIG. 4. The head portion 12b slidably rests on the top of the support portions 22 and 23. The fasteners 11 or 12 are loosely and slidably positioned on the fastener support portion for advancement into the drive track 14 of the fastener driving device.

To provide for advancing the strips of fasteners 11 or 12 toward the drive track 14, there is provided a follower element or fastener pusher 27. The pusher 27 is of generally E-shape and in the disclosed embodiment is formed of a pair of inverted U-sections 27a and 27b, each having outer spaced apart legs 27c and 27d and adjacent other legs 27e and 27f secured together as by a plurality of spot welds 28 to form a single integral center leg identified as 27g. The legs 27c and 27e, and the legs 27d and 27f, are joined together by a bight portion 27h.

The pusher 27 rides on the fastener support portions 22 and 23 with the spaced apart outer legs 27c and 27d on adjacent outer sides of the spaced apart portions 22 and 23 and the common center leg 27g riding in the fastener guide groove 24. The bight portion 27h rides on the top of the fastener support portions 22 and 23 so that the pusher 27 is loosely and slidably mounted on the fastener support portions 22 and 23.

In operation, the pusher 27 is effective to engage a staple-type fastener 11, as best illustrated in FIG. 3, by engagement of the spaced apart outer legs 27c and 27d with the spaced leg portions 11a of the fastener 11 and the bight portion 27h engaging the crown portion 11b of the fastener 11. Moreover, the pusher 27 is effective to engage a nail-type fastener 12 by engagement of the common center leg 27g with the shank portion 27a of the fastener 12 and additionally by engagement of the bight portion 27h with the head portion 12b of the fastener 12.

To provide a means for resiliently biasing the pusher 27 forwardly toward the drive track 14, the magazine assembly 10 includes a pair of tension springs 32 and 33. One end of each of these springs 32 and 33 is connected to a fixed portion of the base plate 18 and the other end of each of the springs 32 and 33 is connected to a transversely extending hook portion 34 formed integrally with the outer legs 27c and 27d of the pusher 27. Of course, it is to be understood that the pusher 27 may be biased forwardly in any suitable manner, such, for example, as illustrated in the above-mentioned patents to O. A. Wandel.

To provide for the guiding of a nail-type fastener 12 through the drive track 14 and, at the same time, to permit the passage of the crown portion 11b of a staple-type fastener 11 and of the head portion 12b of a nail-type fastener 12 to be driven through the drive track 14, the fastener support portions 22 and 23 are provided with forwardly extending retractable spring-loaded guides 35 retractably extending into the drive track 14 and having inner surfaces spaced apart by the width of the fastener guide groove 24 to provide a guide for the shank portions 12a of the nail-type fasteners 12 as they are driven through the drive track 14. Moreover, the guides 35 are provided with inclined upper cam or wedge surfaces 36 inclined downwardly and forwardly into the drive track 14 to provide retraction of the guides 35 from the drive track 14 as the crown portion 11b or the head portion 12b and driving blade 13 are moved through the drive track 14 by a fastener driving operation of the fastener driving device. The guides 35 are spring-biased outwardly to project normally into the drive track 14.

From the above detailed description of the improved fastener magazine 10, its operation is believed clear. However, briefly, it will be understood that sticks of staple-type fasteners 11 or nail-type fasteners 12, as illustrated in FIGS. 3 and 4, respectively, may be selectively interchangeably loaded into the fastener magazine 10 by positioning the fasteners 11 or 12 on the fastener support portions 22 and 23 thereof. The fastener support portions 22 and 23 are effective to support the crown portion 11b of staple-type fasteners 11 or head portion 12b of nail-type fasteners 12. The spaced leg portions 11a are positioned in the grooves 22a and 23a formed between leg portions 18d of the base plate 18 and the support portions 22 and 23. Moreover, the shank portions 12a of nail-type fasteners 12 are accommodated in the guide groove 24 defined by the spaced support portions 22 and 23. The pusher 27 is effective to engage the stick of fasteners 11 or 12 and to advance the fasteners forwardly through the magazine to position a fastener in the drive track 14 of the fastener driving device.

To provide a fastener driving operation, the fastener driving device is provided with a driving blade 13 which moves downwardly through the drive track 14 to engage the crown portion 11b or the head portion 12b of the fasteners 11 or 12 and to drive the fasteners 11 or 12 downwardly into the workpiece. It is understood that the guides 35 which retractably project into the drive track 14 will be automatically cammed inwardly during a driving operation to provide for the passage of the crown portions 11b or head portions 12b and driving blade 13. When the driving blade 13 is withdrawn from the driving track 14, the guides 35 will again be extended into the drive track 14 to position themselves for the succeeding fastener driving operation.

Although the present invention has been described by reference to only a single embodiment thereof, it will be apparent that numerous other modifications and embodiments will be devised by those skilled in the art which will fall within the true spirit and scope of the present invention.

What is claimed as new and desired to be secured by Letters Patent of the United States is:

1. A fastener magazine for a fastener driving device for interchangeably supporting a plurality of staple-stype fasteners and nail-type fasteners in back-to-back relationship and for feeding said fasteners to a fastener drive track; said magazine comprising an elongated, generally U-shaped base member including a bottom portion and a pair of spaced leg portions extending upwardly from the bottom portion; a pair of spaced, longitudinally extending fastener support portions intermediate said spaced leg portions forming a staple support and guide for loosely supporting a strip of inverted U-shaped staple-type fasteners from their crown with the legs of said fasteners positioned adjacent the outer sides of said leg portions for guiding said fasteners along said support portions, and additionally defininig a nail guide groove between them for supporting a strip of nail-type fasteners from their heads with the shanks thereof loosely accommodated in said nail guide groove; a generally E-shaped fastener pusher having a pair of spaced end legs overlying the outer sides of said fastener support portions for engaging a staple-type fastener and having an intermediate leg in said groove for engaging a nail-type fastener; and spring means biasing said pusher toward said drive track.

2. A fastener magazine as set forth in claim 1 including a plurality of retractable guide means extending into said drive track and respectively disposed adjacent said fastener support portions the shank of a nail-type fastener and preventing canting thereof, said guide means being retractable to permit passage of the head of a nail-type fastener and the crown of a staple-type fastener.

3. A fastener magazine as set forth in claim 2 wherein said guide means are provided with camming surfaces to provide automatic retraction thereof during a fastener driving operation.

4. A fastener magazine for interchangeably supporting a plurality of staple-type fasteners and nail-type fasteners in back-to-back relationship and for feeding said fasteners to a fastener drive track; said magazine comprising a base member; a pair of spaced, longitudinally extending fastener support portions carried by said base member and forming a staple support and guide for loosely supporting a strip of staple-type fasteners from their crown, and additionally defining a guide groove between them for supporting a strip of nail-type fasteners from their heads; a fastener pusher having a pair of spaced end legs overlying the outer sides of said fastener support portions for engaging a staple-type fastener and having an intermediate leg in said groove for engaging a nail-type fastener; and means biasing said pusher toward said drive track.

5. A fastener magazine as set forth in claim 4 including a plurality of retractable guides projecting into said drive track adjacent said support portions and respectively disposed on opposite sides of the rail guide groove, each of said guides being retractable to permit passage of fasteners through said drive track.

6. A magazine for interchangeably supporting a plurality of staple-type fasteners and nail-type fasteners in back-to-back relationship and for feeding said fasteners through an opening to a fastener drive track, said magazine comprising a support having first and second spaced grooves for receiving and guiding the legs of a staple-type fastener and a nail guide groove intermediate said spaced grooves for receiving the shank of a nail-type fastener, said nail guide groove and said first and second grooves communicating with said drive track, a first pair of retractable guides extending into the guide track adjacent said support and between the nail groove and the first groove, a second pair of retractable guides extending into the guide track adjacent said support and between the nail guide groove and said second grove, the retractable guides of each pair being spaced apart by a distance less than the length of the nail type fasteners in order to prevent canting of the latter, said guides being retractable to permit passage of both staple-type fasteners and nail-type fasteners through the drive track, pusher means riding on said support for engaging said fasteners, and means biasing said pusher means toward the front of said magazine.

7. The apparatus defined by claim 6 wherein the two pairs of retractable guides are mounted on said support and extend forwardly therefrom into the drive track.

References Cited in the file of this patent

UNITED STATES PATENTS

| | | |
|---|---|---|
| 2,193,143 | Rapien | Mar. 12, 1940 |
| 2,716,749 | Timmerbeil | Sept. 6, 1955 |
| 2,909,780 | Wandel | Oct. 27, 1959 |